United States Patent
Wu et al.

(10) Patent No.: US 12,147,749 B1
(45) Date of Patent: Nov. 19, 2024

(54) CO-OPTIMIZING POWER SUPPLY VOLTAGE IN AN INTEGRATED CIRCUIT DESIGN

(71) Applicant: Synopsys, Inc., Mountain View, CA (US)

(72) Inventors: Qiang Wu, Gilroy, CA (US); Henry S. Sheng, San Mateo, CA (US)

(73) Assignee: Synopsys, Inc., Sunnyvale, CA (US)

( * ) Notice: Subject to any disclaimer, the term of this patent is extended or adjusted under 35 U.S.C. 154(b) by 501 days.

(21) Appl. No.: 17/673,148

(22) Filed: Feb. 16, 2022

Related U.S. Application Data

(60) Provisional application No. 63/150,941, filed on Feb. 18, 2021.

(51) Int. Cl.
| | |
|---|---|
| *G06F 30/392* | (2020.01) |
| *G06F 30/337* | (2020.01) |
| *G06F 30/367* | (2020.01) |
| *G06F 30/373* | (2020.01) |
| *G06F 30/398* | (2020.01) |
| *H01L 23/528* | (2006.01) |
| *H01L 23/52* | (2006.01) |

(52) U.S. Cl.
CPC .......... *G06F 30/392* (2020.01); *G06F 30/398* (2020.01); *H01L 23/5286* (2013.01); *G06F 30/337* (2020.01); *G06F 30/367* (2020.01); *G06F 30/373* (2020.01)

(58) Field of Classification Search
CPC .... G06F 30/392; G06F 30/398; G06F 30/337; G06F 30/367; G06F 30/373; H01L 23/5286
USPC ..... 716/133, 109, 120, 127, 111; 703/14, 18
See application file for complete search history.

(56) References Cited

U.S. PATENT DOCUMENTS

| | | | |
|---|---|---|---|
| 6,948,079 B2 * | 9/2005 | Zhang | G06F 1/3203 713/323 |
| 7,551,985 B1 * | 6/2009 | Chen | G06F 30/327 700/297 |
| 7,912,670 B2 * | 3/2011 | Kim | G06F 11/24 702/117 |
| 8,056,033 B2 * | 11/2011 | Nakashima | G06F 30/367 716/108 |
| 8,103,975 B2 * | 1/2012 | Lewis | G06F 30/394 326/38 |
| 8,508,073 B2 * | 8/2013 | Ma | G11C 5/147 323/267 |
| 9,269,407 B1 * | 2/2016 | Bickford | G11C 5/147 |
| 9,348,959 B1 * | 5/2016 | Tuan | G06F 1/3296 |

(Continued)

FOREIGN PATENT DOCUMENTS

| | | | | | |
|---|---|---|---|---|---|
| CN | 220984174 U | * | 5/2024 | | H03K 17/56 |
| DE | 102004016920 A1 | * | 10/2005 | | H03K 17/687 |

(Continued)

*Primary Examiner* — Phallaka Kik
(74) *Attorney, Agent, or Firm* — Park, Vaughan, Fleming & Dowler LLP; Laxman Sahasrabuddhe

(57) ABSTRACT

A relationship between at least a first metric of an integrated circuit (IC) design and a power supply voltage of the IC design may be determined based on a set of IC designs that have different power supply voltages. Next, the power supply voltage and at least the first metric of the IC design may be modified by interpolating values of the first metric based on the relationship between the first metric and the power supply voltage of the IC design.

20 Claims, 8 Drawing Sheets

Determine a relationship between at least a first metric of an IC design and a power supply voltage of the IC design based on a first set of IC designs that have different power supply voltages — 802

Modify the power supply voltage and at least the first metric of the IC design by interpolating values of the first metric based on the relationship between the first metric and the power supply voltage of the IC design — 804

(56) References Cited

U.S. PATENT DOCUMENTS

| | | | | |
|---|---|---|---|---|
| 9,817,456 B2 * | 11/2017 | Olsson | ...................... | G06F 1/26 |
| 10,649,514 B2 * | 5/2020 | Huang | .................. | G06F 1/3296 |
| 11,493,970 B2 * | 11/2022 | Chun | .................... | G06F 1/3228 |
| 2006/0192596 A1 * | 8/2006 | Ramaraju | ............ | H03K 3/0375 |
| | | | | 327/55 |
| 2007/0194815 A1 * | 8/2007 | Nelson | ............ | H03K 19/00323 |
| | | | | 327/112 |
| 2008/0178023 A1 * | 7/2008 | Kim | ...................... | G06F 1/3203 |
| | | | | 713/322 |
| 2009/0243393 A1 * | 10/2009 | Miyahara | .............. | G06F 30/367 |
| | | | | 716/113 |
| 2018/0013432 A1 * | 1/2018 | Klass | .................... | G06F 1/3296 |

FOREIGN PATENT DOCUMENTS

| | | | | |
|---|---|---|---|---|
| EP | 4105762 A1 * | 12/2022 | ............... | G05F 1/66 |
| JP | H1063703 A * | 3/1998 | ........... | G06F 30/327 |
| JP | 2000332121 A * | 11/2000 | ........... | G06F 17/505 |
| JP | 2006244354 A * | 9/2006 | | |
| JP | 2007226664 A * | 9/2007 | | |
| JP | WO2008114416 A1 * | 7/2010 | ........ | H03K 19/0016 |
| JP | 2011227937 A * | 11/2011 | ........... | G06F 1/3203 |
| JP | 5799645 B2 * | 10/2015 | | |
| JP | 2016045886 A * | 4/2016 | | |
| WO | WO-2008087160 A1 * | 7/2008 | ......... | G01R 31/3004 |

* cited by examiner

CO-OPTIMIZING POWER SUPPLY VOLTAGE IN AN INTEGRATED CIRCUIT DESIGN

RELATED APPLICATION

This application claims the benefit of U.S. Provisional Application Ser. No. 63/150,941, filed on 18 Feb. 2021, the contents of which are herein incorporated by reference in their entirety for all purposes.

TECHNICAL FIELD

The present disclosure relates to integrated circuit (IC) design. More specifically, the present disclosure relates to co-optimizing power supply voltage in an IC design.

BACKGROUND

The size and complexity of IC designs continues increase, and they continue to be used in compute intensive applications which include, but are not limited to, artificial intelligence (AI), data center applications, and mobile devices. The power consumption constraints placed on the IC designs are increasingly stringent due to overheating concerns and/or battery power limitations. It is difficult to design ICs that have high clock speeds and simultaneously consume low power. During circuit optimization, Electronic Design Automation (EDA) tools typically assume that the power supply voltage is constant.

SUMMARY

Embodiments described herein may feature co-optimizing power supply voltage in an IC design. A relationship between at least a first metric of an IC design and a power supply voltage of the IC design may be determined based on a first set of IC designs that have different power supply voltages. Next, the power supply voltage and at least the first metric of the IC design may be modified by interpolating values of the first metric based on the relationship between the first metric and the power supply voltage of the IC design. In some embodiments, the first metric may be one of a total negative slack, a total dynamic power consumption, a total leakage power, and a total IC design area.

In some embodiments, modifying the power supply voltage and the first metric of the IC design includes determining a lower power supply voltage that does not violate a constraint on the first metric. In some embodiments, modifying the power supply voltage and the first metric of the IC design includes determining an improved value of the first metric that does not violate a constraint on the power supply voltage.

In some embodiments, a set of versions of the IC design may be created, where each version of the IC design operates at a different power supply voltage. A first set of IC designs may be obtained by modifying at least the first metric in the set of versions of the IC design while keeping the power supply voltage constant. Next, the first metric in the first set of IC designs may be measured. The measured metric values may then be used to determine a relationship between at least the first metric of an IC design and a power supply voltage of the IC design.

In some embodiments, the power supply voltages of different power domains in the IC design may be modified independently of each other. In some embodiments, the power supply voltages and the first metric may be modified across a set of multi-mode multi-corner (MCMM) scenarios, and a highest power supply voltage may be selected across the set of MCMM scenarios.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
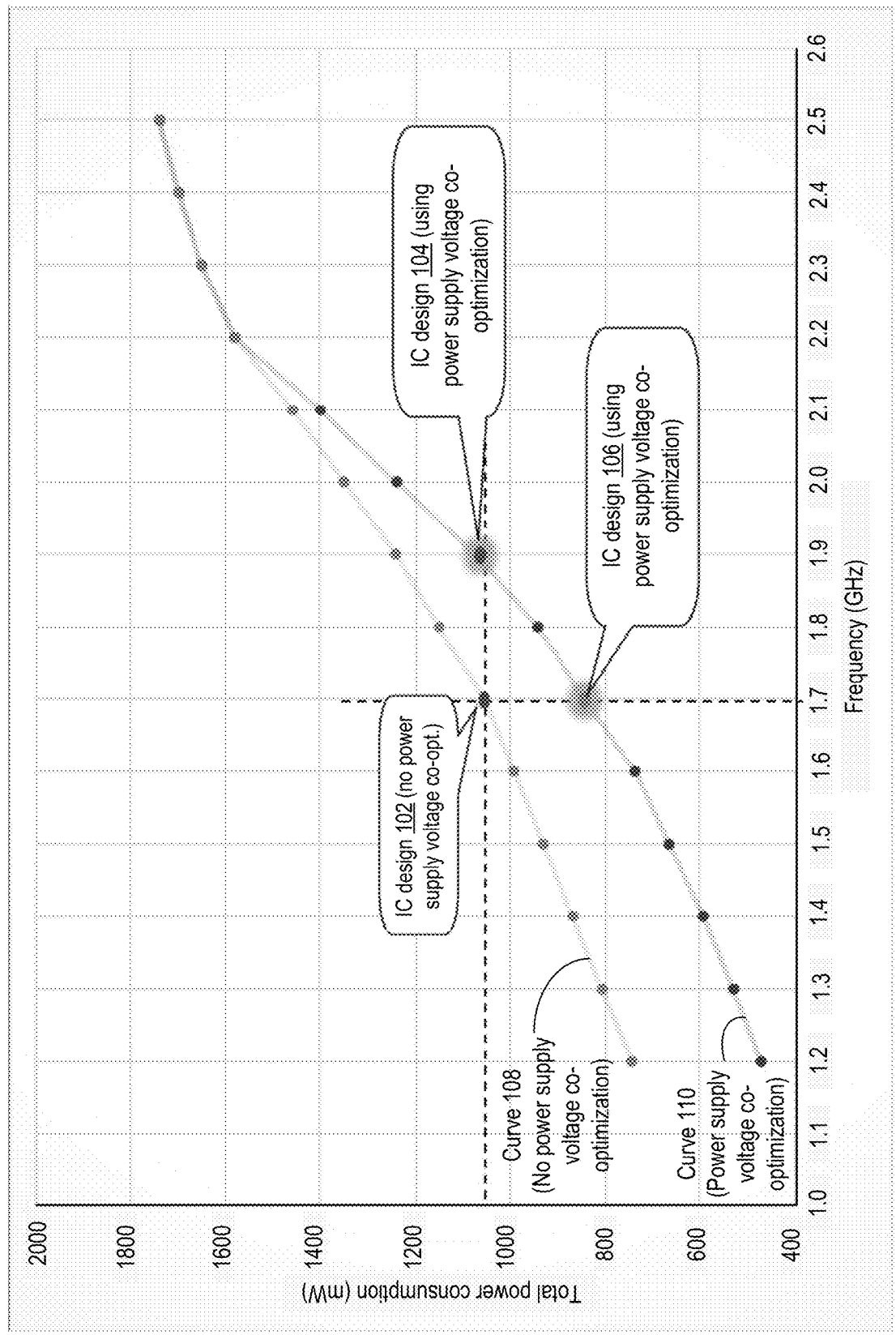
FIGS. 1-2 illustrate how power supply voltage co-optimization can achieve better IC designs in accordance with some embodiments described herein.

Semiconductor industry continues to develop smaller technology nodes with smaller transistor feature sizes for faster speeds and lower power consumption. Meanwhile, this trend also drives EDA tools to develop more advanced techniques to optimize the circuits for performance, power, and area (PPA).

Circuit optimization using EDA tools may be used to create high performance and low power designs. Users may define the circuit architecture and performance and power specification. The goal of circuit optimization is to meet the performance specification with minimum power and area. In many cases, users have to trade-off performance if power consumption is too high.

Many factors affect the power consumption of an IC design. One factor is the power supply voltage. Specifically, the dynamic power consumption varies as the square of the power supply voltage, e.g., $P_{dynamic} \propto fCV^2$, where $P_{dynamic}$ is the dynamic power consumption, f is the toggling frequency (i.e., the frequency at which the signal toggles between low and high voltages), C is the capacitance, and V is the swing voltage (which is a function of the power supply voltage). In a typical IC design flow, the power supply voltage is typically decided before circuit optimization starts. Specifically, power supply voltage is treated as a design input, and it remains constant during the EDA optimization process. In other words, EDA optimization tools do not change the power supply voltage as part of their optimization process.

Some embodiments described herein optimize power supply voltage ($V_{dd}$) in conjunction with optimizing other objectives that include, but are not limited to, timing, power, and area. Cell libraries contain timing and power characterizations (delay and power models) which correspond to a specific power supply voltage. Some embodiments may scale the timing and power models as the power supply voltage is scaled during optimization of the power supply voltage. As a result, the power supply voltage becomes an IC design parameter that is optimized by embodiments described herein, as opposed to merely being an input parameter value (as is the case in traditional IC design flows). In this disclosure, the term "optimize" and its derivatives refer to a process that attempts to increase or decrease an objective function or value (which may be a IC design parameter or metric or a combination of IC design parameters or metrics) while ensuring that a set of constraints are satisfied. An optimized IC design refers to an IC design generated by an optimization process and does not necessarily refer to an IC design in which an objective function or value has an optimum value.

A tradeoff may exist between power consumption and performance. In the equation $P_{dynamic} \propto fCV^2$, the dynamic power can be reduced by reducing voltage. However, reducing the voltage also reduces the rate at which capacitive loads are charged in the IC design, which reduces the switching speed. Embodiments described herein can co-optimize power supply voltage, performance, power, and area. In this disclosure, the term "power supply voltage co-optimization" refers to concurrent optimization of power supply voltage and at least one other IC design metric which may include, but is not limited to, power consumption, performance, and area.

In addition to affecting the dynamic power and performance, the power supply voltage also affects the leakage power because $P_{leakage} \propto I_{leakage} \times V_{dd}$, where $P_{leakage}$ is the leakage power, $I_{leakage}$ is the leakage current, and $V_{dd}$ is the power supply voltage. Thus, the leakage power is proportional to the power supply voltage (the leakage current, $I_{leakage}$, may be dependent on many factors including transistor's threshold voltage $V_{th}$).

Figure 2:
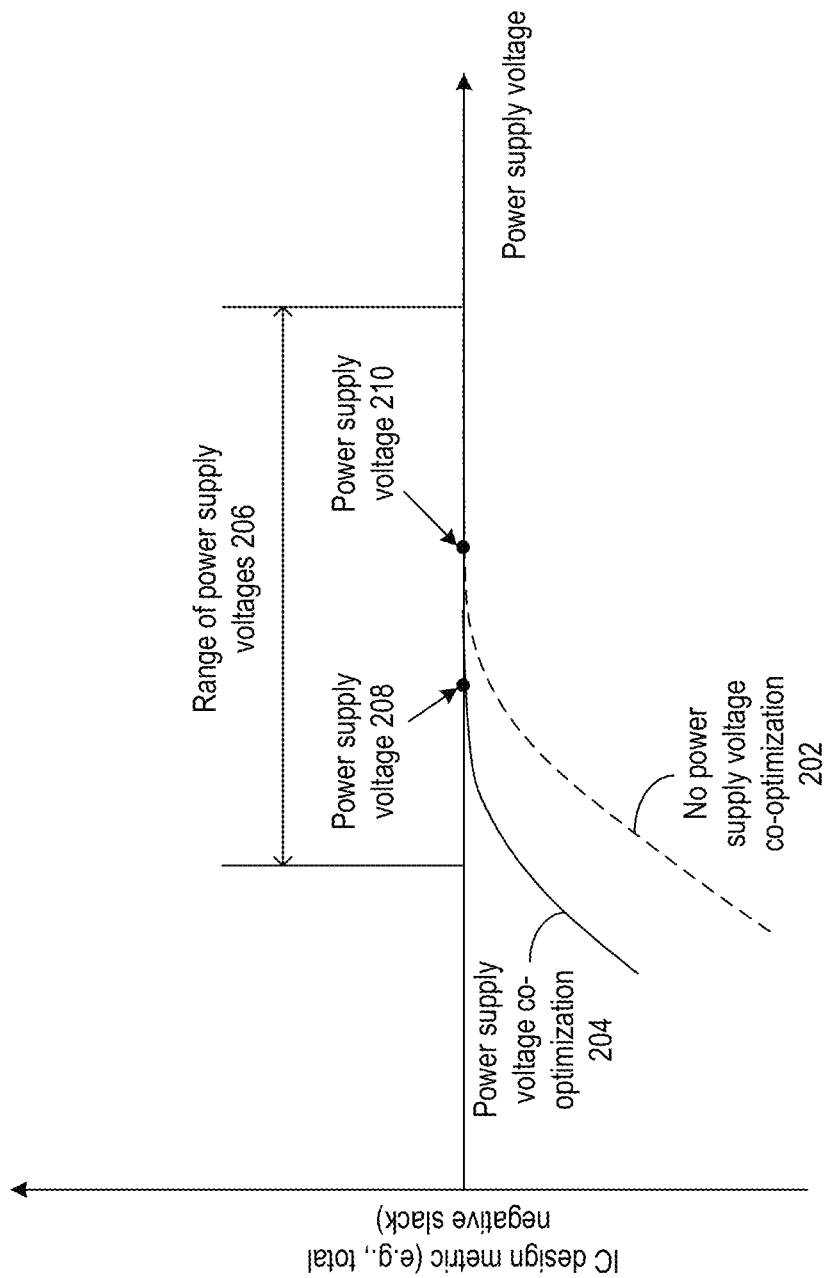

FIGS. 1-2 illustrate how power supply voltage co-optimization can achieve better IC designs in accordance with some embodiments described herein.

In FIG. 1, the X-axis corresponds to the operating frequency of the IC design (higher operating frequency corresponds to higher performance), and the Y-axis corresponds to the power consumption of the IC design. Each data point (e.g., data point 102, 104, and 106) in the plot corresponds to an IC design. Curve 108 corresponds to the results generated when power supply voltage co-optimization is not used, and curve 110 corresponds to the results generated by embodiments described herein that use power supply voltage co-optimization. The following is evident from FIG. 1: (1) for a given operating frequency, power supply voltage co-optimization can produce an IC design with lower power consumption, e.g., compare IC design 106 with IC design 102, and (2) for a given power consumption, power supply voltage co-optimization can produce an IC design with a higher operating frequency, e.g., compare IC design 104 with IC design 102.

In FIG. 2, the X-axis corresponds to the power supply voltage and the Y-axis corresponds to the total negative slack. In an optimization process that does not use power supply voltage co-optimization, the voltage is set to a constant value, and TNS can reach zero (if timing closure is achieved) after the IC design is optimized. If for the same IC design, the voltage level is reduced, then the TNS curve may drop sharply (curve 202). However, when power supply voltage co-optimization is used, the TNS curve may pull-up (curve 204) so that the optimization can still achieve timing closure at a lower voltage level. For example, the power supply voltage 210 may be achieved for zero TNS when power supply voltage co-optimization is not used. On the other hand, the power supply voltage 208 may be achieved for zero TNS when power supply voltage co-optimization is used. Specifically, power supply voltage co-optimization may optimize the power supply voltage over a desired range of power supply voltages 206.

Using constant power supply voltages limit EDA optimization from achieving the optimal PPA. Embodiments described herein automatically optimize the power supply voltage during an IC design optimization flow, which enables the embodiments to examine timing and power impact with accuracy.

Figure 3:
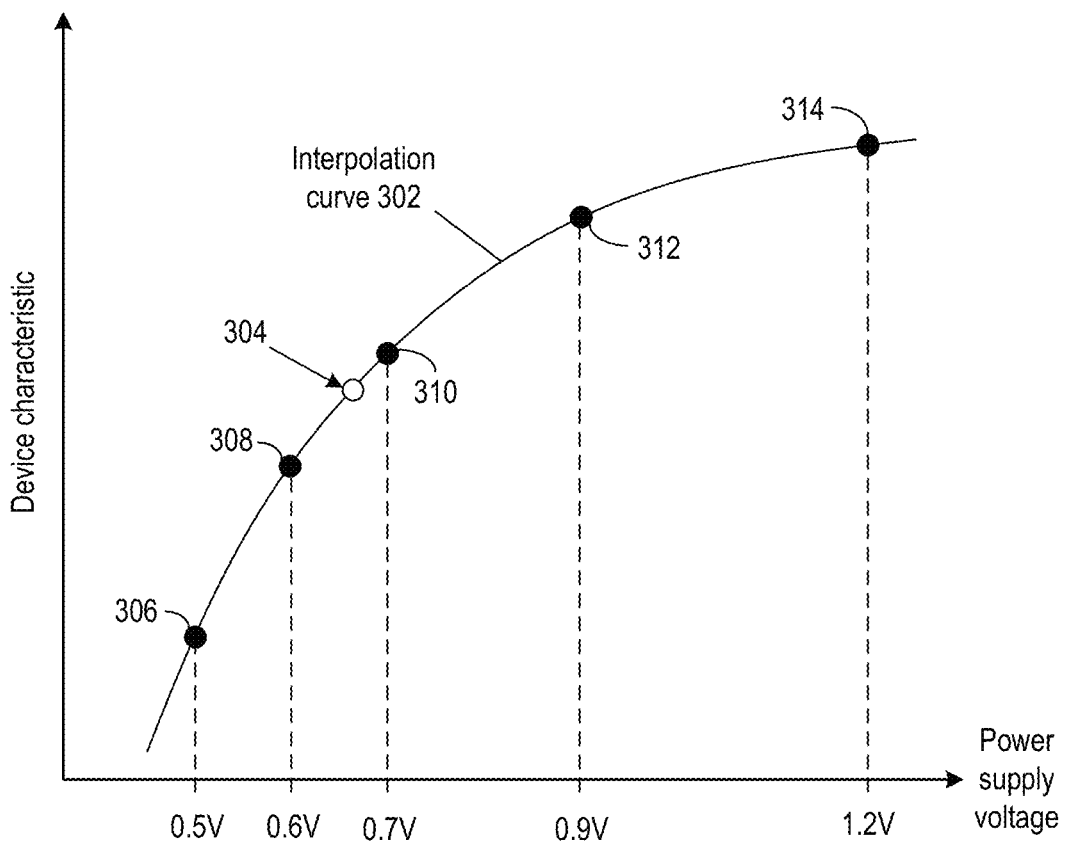
FIG. 3 illustrates a process for using interpolation to scale the delay of a cell based on power supply voltages in accordance with some embodiments described herein.

FIG. 3 illustrates a process for using interpolation to scale the delay of a cell based on power supply voltages in accordance with some embodiments described herein.

In FIG. 3, the X-axis may correspond to the power supply voltage, and the Y-axis may correspond to a device characteristic (e.g., device speed, which may correspond to the highest clock frequency at which a device can operate reliably). A set of cell libraries may be available that are characterized at specific power supply voltages. For example, data points 306, 308, 310, 312, and 314 may represent a device characteristic based on cells libraries for power supply voltages 0.5V, 0.6V, 0.7V, 0.9V, and 1.2V, respectively.

Some embodiments described herein may use an interpolation technique (e.g., polynomial interpolation) to fit interpolation curve 302 based on data points 306, 308, 310, 312, and 314. The device characteristic for any power supply voltage may be determined by using interpolation. For example, some embodiments described herein may use interpolation curve 302 to determine data point 304 corresponding to a power supply voltage of 0.66V. In this manner, library grouping, and voltage scaling can be used to perform timing and power analysis at any voltage within a given voltage range (e.g., 0.5 V to 1.2 V as shown in FIG. 3), and this capability can be used for power supply voltage co-optimization.

An IC design may be optimized across multiple MCMM scenarios. The different corners in MCMM may correspond to different PVTs (Process Voltage Temperature) corners. Optimizing an IC design across multiple MCMM scenarios ensures that the IC design works as desired across a range of PVT variations (e.g., from −25° C. to 125° C. temperatures). For example, it may be ensured that (1) circuit setup timing is satisfied at low voltage and low temperature, and (2) the circuit hold timing is satisfied at high voltage and high temperature. The multi-modes in MCMM scenarios ensure that the IC design operates as desired in different modes, which may include, but are not limited to, functional mode, test mode, mission critical mode (fast and high power), and battery saving mode (slow and low power).

An IC design may be optimized and verified by considering a power supply voltage margin. Embodiments described herein allow the power supply voltage to be changed. A range of power supply voltage values may be considered around a center value. An IC design variant may be created in which the power supply voltage may be moved up to a higher value to meet higher performance, or, pushed down to a lower value to reduce power for lower performance. A power supply voltage margin to cover voltage increase and decreases may be maintained by embodiments described herein.

MV designs may include multiple power domains. Specifically, in MV designs, an IC design may include multiple power domains, where each power domain may have its own power supply voltage. These designs may include power control logic, voltage level shifters, power isolation cells, and always-on cells to handle signals that cross power domain boundaries.

Figure 4:
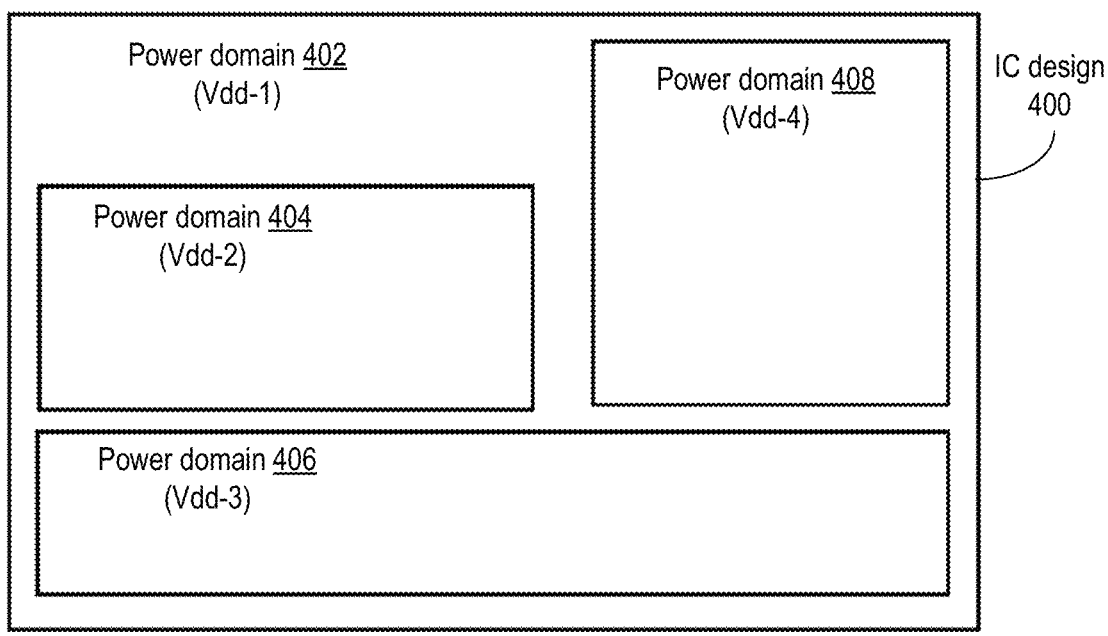
FIG. 4 illustrates a multi-voltage (MV) design in accordance with some embodiments described herein.

FIG. 4 illustrates an MV design in accordance with some embodiments described herein.

Embodiments described herein may allow the power supply voltage ($V_{dd}$) in each power domain to be changed independently of each other. For example, IC design 400 may include power domains 402, 404, 406, and 408. One or more power domains may be selected for power supply voltage co-optimization. During power supply voltage co-optimization, the power supply voltage of each power domain that was selected for optimization may be independently optimized. For example, after power supply voltage co-optimization, power domains 402, 404, 406, and 408 may be optimized to use power supply voltages Vdd-1, Vdd-2, Vdd-3, and Vdd-4, respectively.

Given a set of design inputs (libraries, netlist, SDC, UPF, etc.), embodiments described herein may optimize for performance, power, and area. From power supply voltage co-optimization, a voltage range (lowest to highest voltage) for the power supplies may be provided as input.

Figure 5:
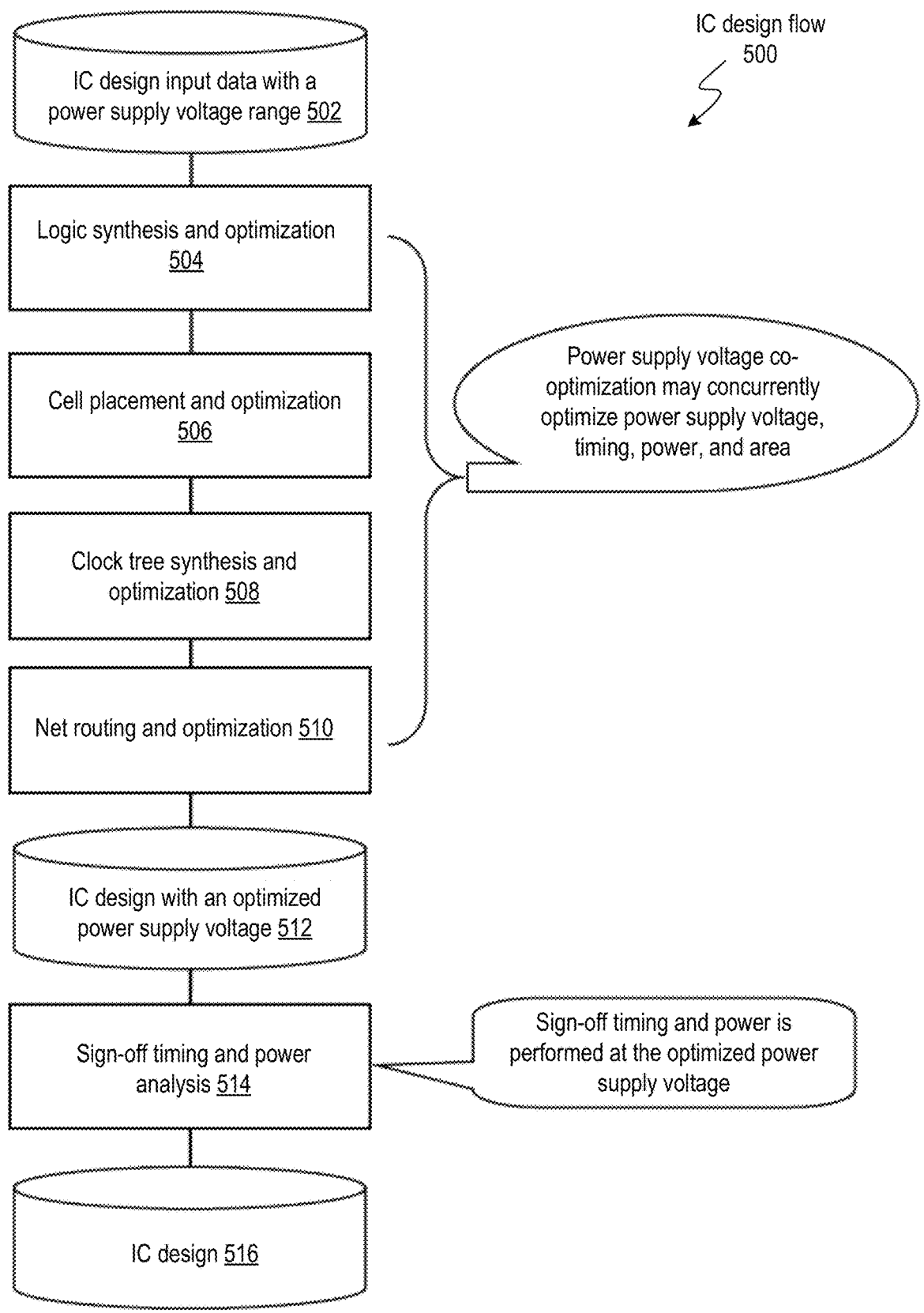
FIG. 5 illustrates an IC design flow in accordance with some embodiments described herein.

FIG. 5 illustrates an IC design flow in accordance with some embodiments described herein.

IC design input data with a power supply voltage range 502 may be provided to IC design flow 500. In IC design flow 500, power supply voltage co-optimization may be performed to concurrently optimize power supply voltage, timing, power, and area during one or more stages which include, but are not limited to, logic synthesis and optimization 504, cell placement and optimization 506, clock tree synthesis and optimization 508, and net routing and optimization 510. An IC design with an optimized power supply voltage 512 may be provided to the sign-off timing and power analysis 514 stage. In sign-off timing and power analysis 514, the optimized power supply voltage may be kept constant. After performing sign-off timing and power analysis 514, the IC design 516 may be provided for manufacturing.

By considering power supply voltage ($V_{dd}$) as a variable (within the range from low to high), the optimization process may evaluate timing quality of results (QoR) at different power supply voltages. For example, TNS is a commonly used timing QoR metric which is sensitive to the power supply voltage. Specifically, when the power supply voltage is decreased, the timing QoR of the IC design may worsen, which may require the timing optimization engine to work harder to meet timing. On the other hand, when power supply voltage is increased, the timing QoR of the IC design may improve, which may make it easier for the timing optimization engine to meet timing constraints.

In the context of TNS, power supply voltage co-optimization may be used to determine the lowest power supply voltage that meets a TNS target. For example, a TNS target of 0 is equivalent to constraining the design to meet timing at a desired clock frequency. Let v1 and v2 represent the low and high ends of the power supply voltage range. Let "vopt" be the power supply voltage which can meet the TNS target. Some embodiments described herein, may use a non-linear co-optimization process to determine a power supply voltage level that meets the TNS target. If there are multiple MCMM scenarios that are desired to be considered, then the TNS target may need to be satisfied for each of the multiple MCMM scenarios during power supply voltage co-optimization.

Figure 6:
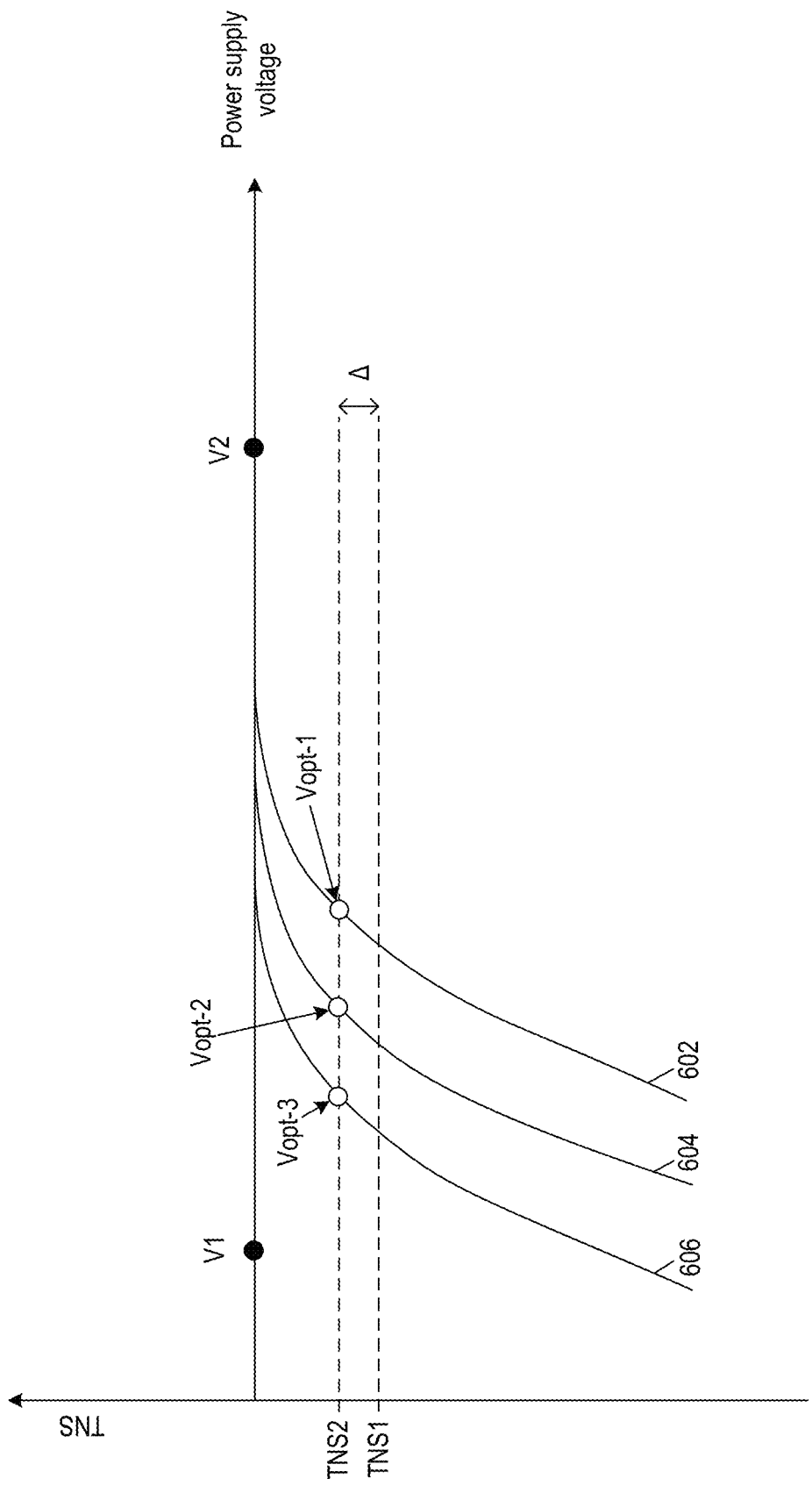
FIG. 6 illustrates a plot of total negative slack (TNS) versus power supply voltage for multiple MCMM scenarios in accordance with some embodiments described herein.

FIG. 6 illustrates a plot of TNS versus power supply voltage for multiple MCMM scenarios in accordance with some embodiments described herein. The X-axis may correspond to the power supply voltage and the Y-axis may correspond to the TNS for an IC design.

In FIG. 6, each plot describes the behavior of the TNS versus the power supply voltage for a given MCMM scenario. Specifically, plots 602, 604, and 606 may be created for three different MCMM scenarios. A power supply voltage range between V1 and V2 may be specified for power supply voltage co-optimization. Additionally, a TNS margin A may be used to obtain the TNS target. Specifically, if a TNS target of TNS1 is received, then TNS margin A may be added to TNS1 to obtain TNS2, which may then be used as the TNS target during power supply voltage co-optimization.

Next, for each MCMM scenario, an optimized power supply voltage may be determined using power supply voltage co-optimization. For example, optimized power supply voltages Vopt-1, Vopt-2, and Vopt-3 may be determined for MCMM scenarios 602, 604, and 606. The MCMM scenario that corresponds to plot 602 may be referred to as the critical MCMM scenario because if the TNS target is met for this MCMM scenario, then the TNS target is guaranteed to be met in the other two MCMM scenarios. In other words, some embodiments described herein may determine the optimized power supply voltage for a set of MCMM scenarios, and the highest optimized power supply voltage may be selected as the optimized power supply voltage for the IC design, i.e., Vopt-IC=Max (Vopt values for the set of MCMM scenarios).

Figure 7:
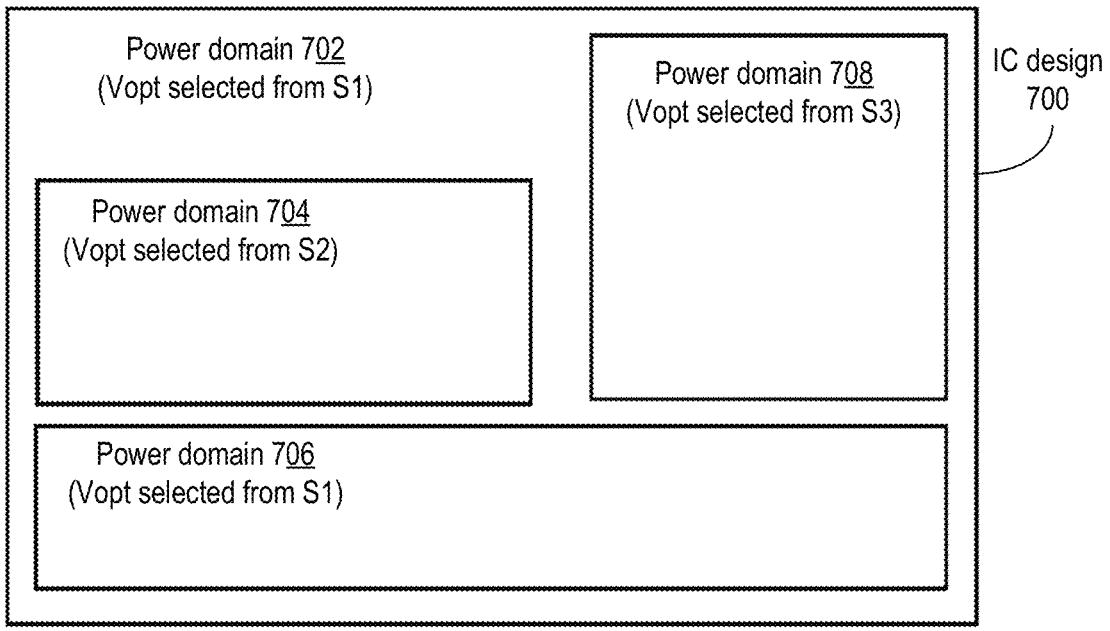
FIG. 7 illustrates selecting optimized power supply voltages across different MCMM scenarios in different voltage domains in accordance with some embodiments described herein.

FIG. 7 illustrates selecting optimized power supply voltages across different MCMM scenarios in different voltage domains in accordance with some embodiments described herein.

IC design 700 may include power domains 702, 704, 706, and 708. During power supply voltage co-optimization, the power supply voltage of each power domain may be independently optimized across multiple MCMM scenarios, e.g., scenarios S1, S2, and S3. For a given power domain, the optimized power supply voltage may be determined for each MCMM scenario, and the maximum optimized power supply voltage may be selected as the optimized power supply voltage for the power domain. Thus, different MCMM scenarios may be the critical MCMM scenarios in different power domains, and the optimized power supply voltage may be selected from different MCMM scenarios in different power domains. For example, after power supply voltage co-optimization, the optimized power supply voltage from scenario S1 may be selected for power domain 702, the optimized power supply voltage from scenario S2 may be selected for power domain 704, the optimized power supply voltage from scenario S1 may be selected for power domain 706, and the optimized power supply voltage from scenario S3 may be selected for power domain 708.

Figure 8:
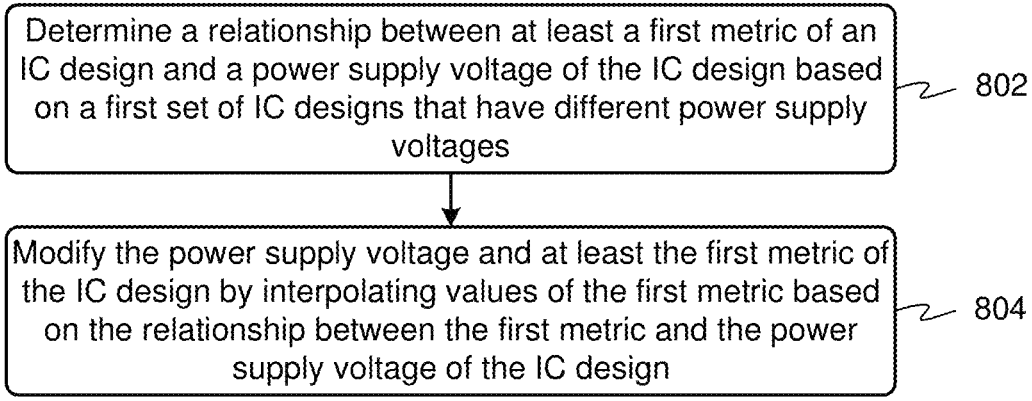
FIG. 8 illustrates a process for co-optimizing power supply voltage in accordance with some embodiments described herein.

FIG. 8 illustrates a process for co-optimizing power supply voltage in accordance with some embodiments described herein.

A relationship may be determined between at least a first metric of an IC design and a power supply voltage of the IC design based on a first set of IC designs that have different power supply voltages (at 802). The metric may generally be any metric of the circuit design that is desired to be optimized. Metrics that may be concurrently optimized with power supply voltage include, but are not limited to, TNS, total dynamic power, total leakage power, and total IC design area.

To determine the relationship, a set of versions of an IC design may be created. Each version of the IC design may operate at a different power supply voltage. Next, a set of optimized IC designs may be obtained by modifying (e.g., optimizing) at least the first metric in the set of versions of the IC design while keeping the power supply voltage constant. Thus, the set of optimized IC designs include IC designs that operate at different power supply voltages and in which at least the first metric has been optimized while keeping the power supply voltage constant. Next, the first metric in the set of optimized IC designs may be measured, and the measured values may then be used to construct a relationship with the power supply voltages.

The power supply voltage and at least the first metric of the IC design may be modified by interpolating values of the first metric based on the relationship between the first metric and the power supply voltage of the IC design (at 804). Modification of the power supply voltage and at least the first metric may be performed together so that a multidimensional space that includes the power supply voltage as one of the dimensions is explored during the optimization process. In some embodiments described herein, a piecewise linear model may be used. In these embodiments, metric values may be linearly interpolated between the two adjacent values in the piecewise linear model. In some embodiments described herein, a polynomial function may be fitted based on the power supply voltages and the measured metric values. In these embodiments, the metric value may be interpolated for a given power supply voltage by using a first fitted polynomial function. Conversely, the power supply voltage may be interpolated for a given metric value by using a second fitted polynomial function (which is substantially the inverse of the first fitted polynomial function).

In some embodiments, modifying the power supply voltage and the first metric of the IC design includes determining a lowest power supply voltage that does not violate a constraint on the first metric. For example, in FIG. 1, IC design 106 (which may be determined by co-optimizing power supply voltage) has a lowest power supply voltage that does not violate an operating frequency constraint (e.g., operating frequency $\geq 1.7$ GHZ). In some embodiments, the concurrent optimization of the power supply voltage and the first metric of the IC design includes determining an improved value of the first metric that does not violate a constraint on the power supply voltage. For example, in FIG. 1, IC design 104 (which may be determined by co-optimizing power supply voltage) has an improved value of the first metric (e.g., higher frequency) that does not violate a constraint on the power supply voltage (e.g., total power consumption $\leq 1050$ mW).

In some embodiments described herein, power supply voltages of different power domains in the IC design may be concurrently optimized independently of each other. In some embodiments described herein, power supply voltages may be concurrently optimized with the first metric across a set of MCMM scenarios, and an optimized power supply voltage is selected across the set of MCMM scenarios. After a modified power supply voltage value has been determined using the process illustrated in FIG. 8, the IC design may be provided to a sign-off timing and power analysis stage (e.g., stage 514 in FIG. 5). Alternatively, the IC design and the modified power supply voltage may be provided to an IC design flow (which may treat the modified power supply voltage as a fixed power supply voltage and which may include one or more stages) to produce a signed-off IC design that is ready for manufacturing.

As an example, consider an IC design D. Multiple versions of the IC design with different power supply voltages may be created. For example, IC design version $D_i$ with power supply voltage $V_i$ may be created, $1 \leq i \leq m$, where m is the number of versions of the IC design. Next, each version of the IC design may be optimized by keeping the power supply constant. One or more metrics may then be measured in each optimized IC designed. For example, suppose metric values $y_i^j$, $1 \leq j \leq n$, where n is the number of metrics, is measured for each optimized IC design $D_i$. Next, a linear or non-linear curve fitting technique may be used to determine a relationship between metric values $y_i^j$ and power supply voltages $V_i$. Specifically, relationship $f^j$ may be created for metric j using the metric values $y_i^j$ and power supply voltage values $V_i$. Thus, given a power supply voltage value v, the value of metric j may be determined using the relationship $f^j$. Next, a set of constraints, an objective function, and the relationships $f^j$ may be provided to a multidimensional optimization technique. The multidimensional optimization technique may then optimize the objective function without violating the set of constraints and use the relationships $f^j$ to determine how different metrics change when the power supply voltage is changed.

The above example may be extended to cover multiple power domains and multiple MCMM scenarios by determining relationships $f^j$ for each combination of power domain and MCMM scenario. Each combination of power domain and MCMM scenario may be optimized separately to produce an optimized power supply voltage for that combination of power domain and MCMM scenario. Next, the maximum power supply voltage across the set of MCMM scenarios may be selected as the optimized power supply voltage for each power domain.

Figure 9:
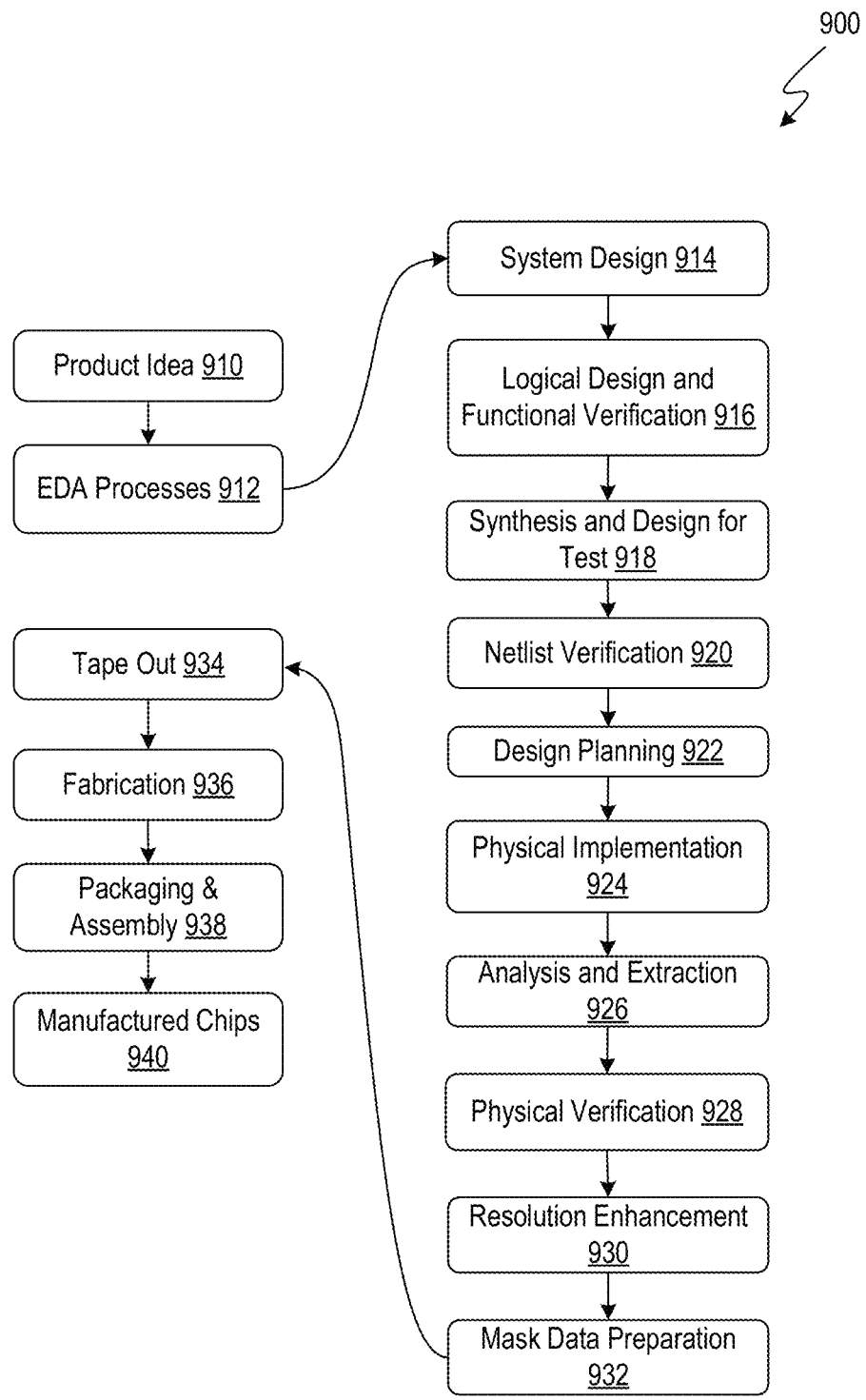
FIG. 9 illustrates an example flow for the design, verification, and fabrication of an IC in accordance with some embodiments described herein.

FIG. 9 illustrates an example flow 900 for the design, verification, and fabrication of an IC in accordance with some embodiments described herein. EDA processes 912 (the acronym "EDA" refers to "Electronic Design Automation") can be used to transform and verify design data and instructions that represent the integrated circuit. Each of these processes can be structured and enabled as multiple modules or operations.

Flow 900 can start with the creation of a product idea 910 with information supplied by a designer, information which is transformed and verified by using EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly 938 are performed to produce the manufactured IC chip 940.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or Open Vera. The HDL description can be transformed to a logic-level register transfer level ("RTL") description, a gate-level description, a layout-level description, or a mask-level description. Each lower representation level that is a less abstract description adds more detail into the design description. The lower levels of representation that are less abstract descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
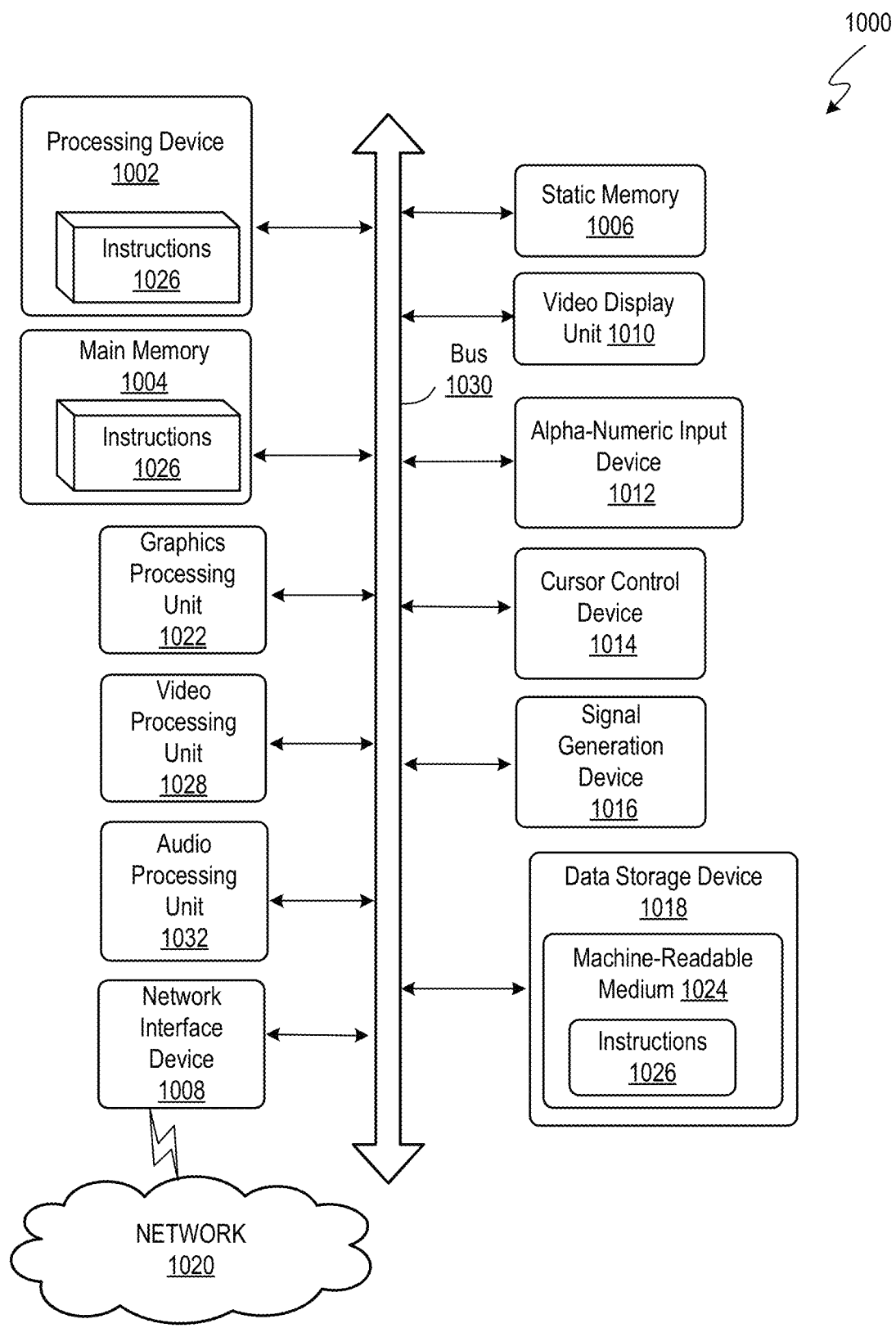
FIG. 10 illustrates an example machine of a computer system within which a set of instructions, for causing the machine to perform any one or more of the methodologies discussed herein, may be executed in accordance with some embodiments disclosed herein.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
   determining a relationship between at least a first metric of an integrated circuit (IC) design and a power supply voltage of the IC design based on a first set of IC designs that have different power supply voltages; and
   modifying, by a processor, the power supply voltage and at least the first metric of the IC design by interpolating values of the first metric based on the relationship between the first metric and the power supply voltage of the IC design.

2. The method of claim 1, wherein the modifying the power supply voltage and the first metric of the IC design comprises determining a lower power supply voltage that does not violate a constraint on the first metric.

3. The method of claim 1, wherein the modifying the power supply voltage and the first metric of the IC design comprises determining an improved value of the first metric that does not violate a constraint on the power supply voltage.

4. The method of claim 1, further comprising:
   creating a set of versions of the IC design, wherein each version of the IC design operates at a different power supply voltage;
   obtaining the first set of IC designs by modifying at least the first metric in the set of versions of the IC design while keeping the power supply voltage constant; and
   measuring the first metric in the first set of IC designs.

5. The method of claim 1, wherein the first metric is one of a total negative slack, a total dynamic power consumption, a total leakage power, and a total IC design area.

6. The method of claim 1, wherein power supply voltages of different power domains in the IC design are modified independently of each other.

7. The method of claim 6, wherein power supply voltages and the first metric are modified across a set of multi-mode multi-corner (MCMM) scenarios, and a highest power supply voltage is selected across the set of MCMM scenarios.

8. A non-transitory computer readable storage medium storing instructions, which when executed by a processor, cause the processor to:
   determine a relationship between at least a first metric of an integrated circuit (IC) design and a power supply voltage of the IC design based on a first set of IC designs that have different power supply voltages; and
   modifying the power supply voltage and at least the first metric of the IC design by interpolating values of the first metric based on the relationship between the first metric and the power supply voltage of the IC design.

9. The non-transitory computer readable storage medium of claim 8, wherein the modifying the power supply voltage and the first metric of the IC design comprises determining a lower power supply voltage that does not violate a constraint on the first metric.

10. The non-transitory computer readable storage medium of claim 8, wherein the modifying the power supply voltage and the first metric of the IC design comprises determining an improved value of the first metric that does not violate a constraint on the power supply voltage.

11. The non-transitory computer readable storage medium of claim 8, further comprising instructions, which when executed by the processor, cause the processor to:
   create a set of versions of the IC design, wherein each version of the IC design operates at a different power supply voltage;
   obtain the first set of IC designs by modifying at least the first metric in the set of versions of the IC design while keeping the power supply voltage constant; and
   measure the first metric in the first set of IC designs.

12. The non-transitory computer readable storage medium of claim 8, wherein the first metric is one of a total negative slack, a total dynamic power consumption, a total leakage power, and a total IC design area.

13. The non-transitory computer readable storage medium of claim 8, wherein power supply voltages of different power domains in the IC design are modified independently of each other.

14. The non-transitory computer readable storage medium of claim 13, wherein power supply voltages and the first metric are modified across a set of multi-mode multi-corner (MCMM) scenarios, and a highest power supply voltage is selected across the set of MCMM scenarios.

15. An apparatus, comprising:
   a memory storing instructions; and
   a processor, coupled with the memory and to execute the instructions, the instructions when executed causing the processor to:
      create a set of versions of an integrated circuit (IC) design, wherein each version of the IC design operates at a different power supply voltage;
      obtain a first set of IC designs by modifying at least a first metric in the set of versions of the IC design while keeping the power supply voltage constant; and
      measure the first metric in the first set of IC designs;
      determine a relationship between at least the first metric and the power supply voltage based on the first set of IC designs; and
      modify the power supply voltage and at least the first metric of the IC design by interpolating values of the first metric based on the relationship between the first metric and the power supply voltage of the IC design.

16. The apparatus of claim 15, wherein the modifying the power supply voltage and the first metric of the IC design comprises determining an a lower power supply voltage that does not violate a constraint on the first metric.

17. The apparatus of claim 15, wherein the modifying the power supply voltage and the first metric of the IC design comprises determining an improved value of the first metric that does not violate a constraint on the power supply voltage.

18. The apparatus of claim 15, wherein the first metric is one of a total negative slack, a total dynamic power consumption, a total leakage power, and a total IC design area.

19. The apparatus of claim 15, wherein power supply voltages of different power domains in the IC design are modified independently of each other.

20. The apparatus of claim 19, wherein power supply voltages and the first metric are modified across a set of multi-mode multi-corner (MCMM) scenarios, and a highest power supply voltage is selected across the set of MCMM scenarios.

* * * * *